United States Patent [19]
Wood et al.

[11] Patent Number: 5,185,299
[45] Date of Patent: * Feb. 9, 1993

[54] MICROCRYSTALLINE ALUMINA-BASED CERAMIC ARTICLES

[75] Inventors: Thomas E. Wood, Maplewood; David M. Wilson, Roseville; Harold G. Sowman, Stillwater, all of Minn.

[73] Assignee: Minnesota Mining and Manufacturing Company, St. Paul, Minn.

[*] Notice: The portion of the term of this patent subsequent to Sep. 4, 2007 has been disclaimed.

[21] Appl. No.: 549,733

[22] Filed: Jul. 9, 1990

Related U.S. Application Data

[63] Continuation-in-part of Ser. No. 318,450, Mar. 1, 1989, Pat. No. 4,954,462, which is a continuation of Ser. No. 58,564, Jun. 5, 1987, abandoned.

[30] Foreign Application Priority Data

| | | | |
|---|---|---|---|
| May 13, 1988 | [CA] | Canada | 566751 |
| Jun. 2, 1988 | [JP] | Japan | 63-136616 |
| Jun. 3, 1988 | [EP] | European Pat. Off. | 88.305061.9 |
| Jun. 3, 1988 | [DE] | Fed. Rep. of Germany | 88.305061.9 |
| Jun. 3, 1988 | [FR] | France | 88.305061.9 |
| Jun. 3, 1988 | [IT] | Italy | 88.305061.9 |
| Jun. 3, 1988 | [ES] | Spain | 88.305061.9 |
| Jun. 3, 1988 | [CH] | Switzerland | 88.305061.9 |
| Jun. 3, 1988 | [GB] | United Kingdom | 88.305061.9 |
| Jun. 4, 1988 | [KR] | Rep. of Korea | 88-6774 |

[51] Int. Cl.$^5$ .................................... C04B 35/10
[52] U.S. Cl. .................................... 501/95; 501/127; 501/128; 501/153
[58] Field of Search ............... 501/95, 127, 12, 128, 501/153

[56] References Cited

U.S. PATENT DOCUMENTS

| | | | |
|---|---|---|---|
| 3,705,223 | 12/1972 | Pearson et al. | 501/127 X |
| 3,808,015 | 4/1974 | Seufert | 106/65 |
| 4,019,914 | 4/1977 | Esper et al. | 501/127 |
| 4,244,835 | 1/1981 | Block | 252/363.5 X |
| 4,320,074 | 3/1982 | Birchall et al. | 501/95 X |
| 4,518,397 | 5/1985 | Leitheiser et al. | 51/309 X |
| 4,678,762 | 7/1987 | Agarwal et al. | 501/127 |
| 4,744,802 | 5/1988 | Schwabel | 51/309 |
| 4,753,904 | 6/1988 | Klolfe | 501/95 |
| 4,757,036 | 7/1988 | Kaar | 501/95 |
| 4,799,938 | 1/1989 | Janz et al. | 51/293 |
| 4,801,399 | 1/1989 | Clark et al. | 252/315.7 X |
| 4,954,462 | 9/1990 | Wood et al. | 501/95 |

FOREIGN PATENT DOCUMENTS 0152768 8/1985 European Pat. Off. ............. 501/127

OTHER PUBLICATIONS

Kumagai and Messing, *Comm. Am. Ceram. Soc.*, C-230 (1984) and *J. Am. Ceram. Soc.*, 68(9), 500 (1985).
G. C. Bye and G. T. Simpkin, *J. Amer. Ceram. Soc.*, 57(8), 367 (1974).
Y. Wakao and T. Hibino, *Nagoya Kogyo Gijutsu Shikensho Hokoku*, 11, 588 (1962).
Suwa et al., *Journal of Materials Science Letters*, 5, 21-24 (1986).
Spiro et al., "The Hydrolytic Polymerization of Iron (III)," *J. Am. Chem. Soc.*, 88, No. 12, (Jun. 20, 1966), pp. 2721-2726.
Pural, Puralox, Disperal High Purity Aluminas, Product brochure from Condea Chemie, pre-1988.
*Synthesis of Alumina by Controlled Chemical Nucleation*, J. L. McArdle, G. L. Messing; talk presented at the 89th Annual American Ceramic Society meeting, Pittsburgh, PA, Apr. 28, 1987. Alpha-iron oxide is disclosed as a seeding agent for boehmite-derived alumina. There is no disclosure to the use of hydroxy iron polymers as nucleating agents for basic aluminum salt-derived aluminas.

*Primary Examiner*—Mark L. Bell
*Assistant Examiner*—Lisa Schull
*Attorney, Agent, or Firm*—Gary L. Griswold; Walter N. Kirn; Lorraine R. Sherman

[57] ABSTRACT

Microcrystalline alpha-alumina based ceramic articles comprising at least 60% alumina by weight, and 0.1-7.0 percent by weight iron equivalence in which substantially all the alumina is in the alpha phase having a uniform grain structure comprising alpha alumina crystallites with an average crystallite size less than 0.5 micrometer and a density greater than 90% theoretical are disclosed. Ceramic articles particularly useful as high modulus refractory fibers, among other shaped bodies such as beads, flakes, coatings, and shaped or randomly-shaped abrasive particles, are produced from a unique sol-gel process wherein hydroxy iron polymers are utilized to nucleate the alpha alumina transformation. An inherent advantage of the unique process disclosed is the resulting fine grained microstructure, and a surface roughness height of less than 100.0 nm, which is essential if a ceramic article such as an alpha alumina fiber is to have reasonable strength.

20 Claims, No Drawings

MICROCRYSTALLINE ALUMINA-BASED CERAMIC ARTICLES

This application is a continuation-in-part of application Ser. No. 07/318,450, filed Mar. 1, 1989 which is a continuation of application Ser. No. 07/058,564, filed Jun. 5, 1987, now abandoned.

TECHNICAL FIELD

The present invention relates to microcrystalline alpha alumina-based ceramic articles. In another aspect, a process for preparing the alpha alumina-based ceramic articles of the invention is disclosed. In a still further aspect, a layered structure comprising a support coated with an alpha alumina-based ceramic coating is disclosed.

BACKGROUND OF THE INVENTION

Traditionally the preparation of very fine grained, dense alpha alumina has been difficult. With the exception of diaspore (beta alumina monohydrate), the firing of other alumina precursors such as basic aluminum salts, aluminum hydroxides or boehmite (alpha alumina monohydrate) to generate alpha alumina involves first the formation of intermediate, metastable transition alumina phases. The transition aluminas, although possessing very fine microstructures, convert to alpha alumina with considerable coarsening, and often require very high temperatures for densification.

U.S. Pat. No. 3,808,015 discloses the preparation of microcrystalline alpha alumina ceramic fibers by the extrusion of a concentrated slurry of fine particles of alpha alumina in an aqueous phase which contains a precursor of alumina followed by firing to at least 1400° C. to convert the fibers to dense alpha aluminum oxide. The concentrated slurry of alpha alumina particles was taught as necessary to overcome the problems of fiber shrinkage during firing and the problem of filament-to-filament sticking during the spinning and the firing steps. These fibers, however, are limited in strength and flexibility by the presence of relatively large flaws which could have resulted from the imperfect dispersion of the alumina particles or from the presence of large particulate alumina in the spin mix. These fibers are also characterized by a microscopic roughness height between about 1,100 and 7,000 Angstroms. This rough surface makes handling procedures such as weaving difficult and reduces the flexibility of woven articles derived therefrom. More recently, Kumagai and Messing [*Comm. Am. Ceram. Soc.* C-230 (1984) and *J. Am. Ceram. Soc.* 68(9), 500 (1985)] reported that the seeding of boehmite sols with fine alpha alumina powder resulted in enhanced densification at modest firing temperatures (1200° C.), and enabled the preparation of dense, submicron microstructures. Both of these processes utilized the addition of particulate crystalline alpha alumina to enable the production of dense, microcrystalline alpha alumina. It is believed that the finely divided alpha alumina provides templates for the epitaxial growth of alpha alumina from the transition alumina.

Suwa et al., *Journal of Materials Science Letters* 5, 21-24 (1986) also disclose the use of particulate alpha $Fe_2O_3$ as having a minor effect in seeding the alpha alumina transformation in aluminas prepared from boehmite sols.

G. C. Bye and G. T. Simpkin, *J. Amer. Ceram. Soc.*, 57(8), 367 (1974); Y. Wakao and T. Hibino, *Nagoya Kogyo Gijutsu Shikensho Hokoku*, 11, 588 (1962) have shown that the doping of alumina with small amounts of metal ions such as iron(III), and chromium(III) can lower the temperature at which the transition aluminas are converted to the alpha phase. These ions have ionic radii and charge densities similar to that of $Al^{3+}$ and also form sesquioxides isomorphous with alpha alumina. The hydrous oxides of these metals convert to the alpha form at much lower temperatures than the corresponding hydrous aluminas. The doping of alumina with these metal ions, however, has not resulted in the generation of dense, microcrystalline alpha alumina.

Because of the high modulus, strength, and chemical and high temperature resistance of alpha alumina, fibers of this material are desired for application as high temperature filtration media, refractory insulation, and structural composite reinforcement. A very fine microstructure is requisite for the production of strong, non-friable ceramic fibers. In applications where a textile quality fiber is desired, such as in the production of articles which require weaving, a smooth fiber surface is desirable. In addition to application in ceramic fibers, fine structured alpha alumina of high density has been found to perform as a superior abrasive.

SUMMARY OF THE INVENTION

Briefly, the present invention provides a solid, shaped and fired refractory article comprising at least 60% alumina by weight, preferably 90% by weight, in which substantially all the alumina is in the alpha phase having a uniform grain structure comprising alpha alumina crystallites wherein the average crystallite diameter is less than 0.5 micrometer and substantially all the alpha alumina crystallites are less than 0.7 micrometer in diameter and the density of the article is greater than 90% of theoretical density. The refractory article can also comprise up to 40 percent by weight of nucleating agents and modifying agents.

This invention provides transparent, strong, flexible, smooth and refractory fibers comprised of microcrystalline alpha alumina, and articles made from or containing them, such as woven textiles and mats of such fibers or composites containing such fibers as reinforcement.

The present invention provides a process for preparing dense, very fine grained (average grain size less than 0.5 micrometer) alpha alumina and the production of superior ceramic articles therefrom such as high modulus refractory fibers, ceramic microspheres, alpha alumina powders and other alumina articles.

The method of the present invention utilizes nucleating agents to induce the formation of alpha phase nuclei and, in this fashion, increase the number density of nuclei during the transformation to the alpha phase of alumina derived from essentially amorphous alumina precursors so that a microcrystalline (<0.5 micrometer average grain size), dense (>90% theoretical) alpha alumina structure results after firing to a sufficiently high temperature.

The method of the present invention provides for the complete conversion of a basic aluminum salt derived alumina to the alpha form below 1000° C., resulting in a very fine alpha alumina microstructure. The alpha alumina ceramic fibers of this invention can be prepared in a continuous fashion and when fully transformed and dense, possess a very fine microstructure (average grain size less than 0.5 micrometer). These fibers are strong, transparent, flexible and smooth. The smooth surface of these novel fibers makes them suitable for weaving, and the high modulus of these fibers makes them useful in reinforcing applications. In describing the ceramic bodies of this invention, we will often mention fibers due to their great utility, but it should be recognized that other shapes such as microspheres, bubbles, flakes, coatings, powders or other forms are included.

We have discovered that hydrous iron polymers (HIP), also known as polynuclear ferric hydroxy complexes, which can have the formula, for example,

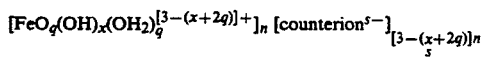

wherein (x+2q) has a value of 2.0 to 2.5, inclusively, and S is the charge of the counterion having a value of 1, 2, or 3, and n can be greater than 500, generally 600 to 1000, and counterion can be any water-solubilizing anion such as nitrate, chloride, perchlorate, or water-solubilizing carboxylates such as citrate and tartrate and iron containing colloidal material derived therefrom when mixed in solution with a suitable alumina precursor such as a basic aluminum salt are very efficient nucleating agents for the alpha alumina transformation in the resulting alumina. Even at very low levels of equivalent iron content (in some cases less than 0.1% by weight equivalent iron) these agents are much more efficient at inducing nucleation of the alpha alumina transformation than simple iron or chromium salts, and in this fashion, substantially dense, fully transformed, microcrystalline alpha alumina has been prepared in the form of fibers, powders, flakes, and microspheres. A preferred hydrous iron polymer has the formula [Fe(OH)$_x$(NO$_3$)$_{3-x}$]$_n$, where $2.3<x<2.5$. These polymers are known in the chemical literature [see for example: P. J. Murphy, A. M. Posner, and J. P. Quirk, *J. Colloid Interface Sci.* 56, 270 (1976); T. G. Spiro, S. E. Allerton, J. Renner, A. Terzis, R. Bils, and P. Saltman, *J. Am. Chem. Soc.* 88, 2721 (1966); D. L. Segal, *J. Chem. Tech. Biotechnol.* 34A, 25 (1984)]. The use of these hydrous iron polymers, which as prepared are usually amorphous to X-rays, as nucleating agents avoids the problems introduced by the use of concentrated slurries of relatively large crystalline alpha alumina and enables very rapid densification kinetics and very low transformation temperatures to be achieved. Even without the use of a concentrated slurry of alpha alumina, such as is disclosed in U.S. Pat. No. 3,808,015, these fibers do not exhibit problems with respect to sticking together during firing. Even though a great amount of shrinkage occurs during the transformation to the alpha phase and densification, strong, flexible alpha alumina fibers can be obtained by the process described herein.

In this application:

"amorphous to X-ray" means that upon subjection to X-ray analysis no well-defined line pattern is obtained;

"substantially dense" means greater than 90% of theoretical density; and

"substantially all" means at least 95 percent, preferably 99 percent, of an article has a certain property;

"percent by weight" means, unless otherwise stated, the percent of a component in relation to the weight of the total fired product; and "roughness height of less than 100 nm" means that average measured values of surface roughness height are less than one hundred nanometers in height (i.e., less than 100.0 nm; this excludes average values of 100.0 nm, 101.0 nm, 102.0 nm, 103.0 nm, . . . etc.)

DETAILED DESCRIPTION

Microcrystalline alpha-alumina based ceramic articles of the present invention can be provided by the addition of suitable quantities, for example 0.1 to 7.0 weight percent iron equivalence, preferably 0.3 to 1.5 weight percent iron equivalence, of at least one colloidal-polymeric hydrous iron complex to an alumina precursor such as a basic aluminum salt solution. The polymer which is generated by the controlled hydrolysis of an iron salt solutions when added to an alumina precursor, such as a basic aluminum salt solution, dramatically increases the alpha phase nucleation density during calcining of the derived alumina resulting in the production of a fully converted, very fine (average crystallite size less than 0.5 micrometer), and substantially dense alpha alumina microstructure. The alumina derived from basic aluminum salts without the addition of the nucleating agents convert to alpha alumina at approximately 1100°–1150° C. and a weak, porous and large grained (average grain size greater than 4 micrometers) structure is obtained. In the instant invention, the complete conversion to alpha alumina can occur rapidly at a temperature below 1000° C.

Nucleating agents are utilized in the present invention to induce the formation of alpha phase nuclei so that a microcrystalline, dense alpha alumina structure results after firing to a sufficiently high temperature.

The hydrous iron polymer nucleating agents useful in this invention can be prepared by the hydrolysis of an iron salt solution. Iron nitrate has been found to be particularly useful, although salts of other anions could be used as a source of iron. In general the iron salt is present at a concentration of 0.15M or less. A useful preparation of a solution of the active iron containing nucleating agents involves the partial neutralization of a dilute solution of an iron salt with a base. Carbonate and bicarbonate containing salts are particularly suitable bases although other sources of hydroxide ions such as hydroxide salts such as ammonium hydroxide and alkaline metal and alkaline earth hydroxides and other proton accepting compounds can be used to promote the hydrolysis of the iron salt solution and form the active nucleating agents. The base can be gradually mixed with the iron salt in such a way as to avoid local flocculation of hydrous iron oxide. Generally, a solution containing the hydroxide source or proton acceptor is gradually added to a rapidly stirred solution containing the iron salt. Because iron salts hydrolyze so readily, the iron salt solution is already partially hydrolyzed before the addition of the base, simply by dilution with the water to obtain the desired concentration. Generally, 1.0 to 2.5 equivalents of base are added per equivalent of iron. Less hydrolyzed solutions, such as those partially neutralized with 1.0 to 1.7 equivalents of base per equivalent of iron, will be somewhat active as nucleating agents. The more highly hydrolyzed solutions, however, such as those partially neutralized with 2.0 to 2.5 equivalents of base per equivalent of iron, in particular those partially neutralized with 2.5 equivalents of base per equivalent of iron, are very active as nucleating agents for the alpha alumina transformation in basic aluminum salt-derived alumina. Other treatments of iron salt solutions which promote hydrolysis such as dilution, dialysis or heating, etc., can also be used to prepare active nucleating agents.

Solutions containing the active nucleating agents of this invention at a concentration of 0.25 molar or greater are generally deep red-brown to deep burgundy-red in color and can be clear to slightly hazy in appearance. The solutions of partially neutralized iron nitrate ($OH^-$:$Fe^{3+}$ =2.5:1) as described herein have been shown to contain small, e.g. 1.5–7.0 nanometers (15–70 Angstroms), discrete particles of a hydrous, polymeric iron complex as determined by transmission electron microscopy (TEM).

Although the solutions of the nucleating agents are active immediately after generation by partial neutralization, the activity of these materials as nucleating agents, as evidenced by the amount of agent necessary to induce a fine microstructure in the alumina resulting from the firing of basic aluminum salt-derived precursors is increased if the solution containing the nucleating agent is heated to 60° to 100° C. for a brief period of time prior to mixing with the solution of the basic aluminum salt. An examination of the particles in these heat treated solutions with transmission electron microscopy confirmed that the solutions still contained small, unagglomerated, spherical particles after this heating step. It is believed that this heating step induces crosslinking and densification within the hydrous, polymeric iron complex. It is possible that this crosslinking reduces the penetration of the small basic aluminum salt cations into the coiled hydrous iron polymer particles during mixing and processing. This sort of mixing may reduce the nucleating capability of the hydrous iron polymer.

The preferred nucleating agents when mixed with an alumina precursor such as a solution of a basic aluminum salt with a carboxylate or nitrate counterion at levels as low as 0.07% equivalent weight of iron (this value depends on the preparation of the nucleating agent) dramatically increase the alpha alumina nucleation frequency. This is evidenced by a) a lowering of the temperature at which alpha alumina appears, b) an enhancement of densification kinetics, and c) the generation of a fully converted, very fine (average crystallites less than 0.5 micrometer), dense, alpha alumina microstructure. The basic aluminum carboxylate derived alumina without any additives converts to the alpha form at about 1100°–1110° C., and a weak, porous, large grained (average grain size greater than 4 micrometers) structure results. The densification of this alumina only occurs with difficulty at very high temperatures (greater than 1500° C.). On the other hand, basic aluminum salt derived alumina which has been treated with 0.7% by weight equivalent iron in the form of the hydrous iron polymer nucleating agent utilized in the present invention, converts completely to alpha alumina below 1000° C., and is substantially dense after firing at 1300° C. for 5 minutes. In addition, after densification the alumina possesses a very uniform microstructure and can be made with an average grain size of about 0.2–0.3 micrometer. The average grain diameter and the percent of grains in each size fraction for a sample of the inventive alumina fibers (0.7% by weight equivalent iron) after firing to 1300° C. for 5 minutes are as follows: 0–0.16 micrometer (34%), 0.16–0.30 micrometer (55%), 0.30–0.45 micrometer (11%), greater than 0.5 micrometer (0%) wherein the overall average grain diameter is about 0.22 micrometer.

Other metal ions and metal complexes can be mixed with the iron salt prior to partial neutralization and concurrent hydrolysis and, in this fashion, be intergrated into the hydrous iron polymer mixture by co-hydrolysis (doping may take place). Depending on the identity of the metal, the species produced by co-hydrolysis can be very active as a nucleating agent for the alpha alumina transformation as described herein or it can be lower in nucleating capability than the polymeric iron complex. For example, the co-hydrolysis with 25 mole % $Al^{3+}$ ions results in a metal complex mixture which, when used as a nucleating agent in basic aluminum carboxylate derived alumina as described herein, results in an alumina which exhibits about an 80° C. higher alpha alumina transformation temperature than exhibited by a similarly prepared alumina derived from an aluminum carboxylate nucleated with the undoped hydrous iron polymer. In addition, the microstructure of the resulting alpha alumina after densification, while showing evidence of enhanced nucleation, is somewhat coarser than the microstructure of the alpha alumina which had been nucleated with the hydrous iron homopolymer. Complexes prepared by the cohydrolysis of mixtures of iron and chromium salts, on the other hand, can be as efficient at nucleating the alpha alumina transformation in basic aluminum salt derived alumina as the hydrous iron complex.

Upon aging, these hydrous iron polymer particles slowly agglomerate and begin to develop higher order crystallinity. A slight amount of agglomeration is not detrimental (e.g., agglomerate sizes up to 20 nm are useful), but as the particles continue to agglomerate, increased turbidity appears in the solutions containing the nucleating agents. Although these aged solutions are still active, the ability of these agents to generate a very fine and homogeneous alpha alumina microstructure is diminished by excessive agglomeration. The aging of these solutions can be slowed down by dialyzing the hydrous iron polymer solutions after preparation.

In preparing the novel articles of the invention, suitable aluminum compounds which can be used as alumina precursors representatively include basic aluminum carboxylates, basic aluminum nitrates, partially hydrolyzed aluminum alkoxides or other aluminum salts and complexes. Most preferred are the basic aluminum salts with carboxylate or nitrate counterions or mixtures of these salts. In the case of the basic aluminum carboxylates, these are of the general formula $Al(OH)_y$(carboxylate)$_{3-y}$, where y is between 1 and 2, preferably between 1 and 1.5, and the carboxylate counterion is selected from the group consisting of formate, acetate, propionate, and oxalate or combinations of these carboxylates. These materials can be prepared by digesting aluminum metal in a solution of the carboxylic acid as described in U.S. Pat. No. 3,957,598. The basic aluminum nitrates can also be prepared by digesting aluminum metal in a nitric acid solution as described in U.S. Pat. No. 3,340,205 or British patent 1,193,258, or by the thermal decomposition of aluminum nitrate as described in U.S. Pat. No. 2,127,504. These materials can also be prepared by partially neutralizing an aluminum salt with a base. The basic aluminum nitrates have the general formula $Al(OH)_z(NO_3)_{3-z}$, where z is between about 0.5 to 2.5.

Most basic aluminum salts initially calcine to form an X-ray amorphous alumina from which finely microcrystalline eta or gamma alumina crystallizes at 850°–950° C. The temperature at which the transition alumina converts to the alpha phase depends on the nature of the basic aluminum salt (extent of hydrolysis, identity of the counterion, and thermal history).

The aqueous solutions which are used to make the novel materials of this invention optionally can also contain an effective amount of various other water-soluble metal compounds (calcinable to the metal oxide) which will impart additional desired properties to the high modulus fibers. It is well known in the art that small (<0.5% by weight) additions of MgO greatly reduce grain growth in alpha-$Al_2O_3$ ceramics during sintering, thereby reducing intragranular voids or porosity and allowing the attainment of higher densities. We have found that the addition of small amounts (0.05-1.0% by weight MgO) can increase the fired density of fibers of the present invention. Since elastic modulus will be greatly reduced by the presence of porosity in the fired fibers, the addition of small amounts of MgO can lead to an improvement in elastic modulus.

Zirconia when used as an additive, particularly in the form of colloidal zirconia up to 40% by weight, has been found to be unique as a metal oxide in its ability to markedly decrease the growth of the alpha alumina crystallites in materials prepared according to the controlled nucleation processes of this invention when exposed to temperatures greater than 1400° C. This incorporation of zirconia enables the inventive alpha alumina based ceramic fibers to be used at higher temperatures while retaining flexibility and strength.

The use of $SiO_2$ as an additive has been found to markedly decrease the mean grain size of the transformed alpha alumina crystallites of the present invention. Essentially dense, microcrystalline alpha-$Al_2O_3$ having an average grain size of 0.15 micrometer or less with substantially all crystallites being less than 0.25 micrometer can be routinely prepared, resulting in increased transparency, tensile strength and, in the case of fibers, greatly improved flexibility and handleability. The preferred $SiO_2$ additive level has been found to be 0.10-3.5% by weight (more preferably 0.5-2.0% by weight), although very fine alpha-$Al_2O_3$ crystallites are produced at additive levels up to 15% by weight $SiO_2$.

The silica precursor may be any water-soluble silica source which burns to form residual $SiO_2$, such as aqueous silica sols, solutions of alkoxysilanes or siloxane polymers and oligomers. A very small particle size $SiO_2$ sol such as Nalco TM 2326 (Nalco Chemical Co., Oak Brook, Ill.) is particularly useful due to its commercial availability and small particle size (5 nm). In the case of Nalco 2326, which has a pH of approximately 9-10, the sol must be either rapidly acidified or diluted to prevent gelation or flocculation during the addition of the silica sol to the alumina precursor solution.

Other glass-forming metal oxides such as $B_2O_3$ and $P_2O_5$ can also have a grain-refining effect on alumina during the transformation to the alpha phase.

Compatible heat fugitive organic agents can be incorporated as adjuvants in the starting material to improve shelf-life of the subsequently concentrated dispersion or to improve the fiberizing nature of the latter. Such organic agents representatively include polyvinylpyrrolidone, polyethylene oxide, lactic acid, corn syrup, and mixtures thereof, these additives being oxidized and removed during the firing of the green articles produced from such systems.

The fiber starting material, as initially prepared, will be a relatively dilute liquid, generally containing about 5 to 20 weight percent equivalent oxide solids, which can be calculated from a knowledge of the equivalent oxide solids in the raw materials and the amounts thereof used, or determined by calcining samples of the raw materials or fiber starting material. For the preparation of fibers, it is necessary to concentrate or viscosify said dilute liquid in order to convert it to a viscous fluid concentrate which will readily solidify when the concentrate is extruded and drawn in air to form fibers. The concentration step can be carried out by techniques known in the art, e.g., see said U.S. Pat. No. 3,795,524. Sufficient concentration will be obtained when the equivalent oxide solids content is generally in the range of 20 to 40, preferably less than 35, weight percent, and viscosities (Brookfield at ambient room temperature) are in the range of 15,000 to 1,000,000 cP (centipoises) preferably 45,000 to 600,000 cP, depending on the type of fiberizing or dehydrative solidifying technique and apparatus used and the desired shape of the green fiber. High viscosities tend to result in fibers which are circular in cross-section whereas low viscosities (e.g., less than 50,000 cP) tend to result in fibers which are oval in cross-section.

In making continuous fibers, the viscous concentrate can be extruded through a plurality of orifices (e.g., up to 400 or more) from a stationary head and the resulting green fibers allowed to fall in air by the force of gravity or drawn mechanically in air by means of drawing rolls or a drum or winding device rotating at a speed faster than the rate of extrusion. The concentrate can also be extruded through orifices from a stationary or rotating head and blown by parallel, oblique or tangential streams of air, such as in the making of cotton candy, the resulting blown green (unfired) fibers being in staple form or short form with lengths generally 25 cm or less (rather than in long or continuous form) and collected on a screen or the like in in the form of a mat. Any of these forces exerted on the extruded, green fibers, e.g., gravity, drawing, or air streams, cause attenuation or stretching of the fibers, reducing their diameter by about 50 to 90 percent or more and increasing their length by about 300 to 10,000 percent or more and serving to hasten or aid the drying of the green fibers.

The dehydrative solidifying of the green fibers can be carried out in ambient air, or heated air can be used if desirable or necessary to obtain fast drying. The drying rate assists in controlling of the shape of the fiber. The relative humidity of such air should be controlled since large amounts of moisture will cause the solidified or shaped green fibers to stick together, and excessively dry atmosphere can lead to fiber breakage. Generally, air with relative humidity in the range of 20 to 60 percent can be used, at temperatures of 15° to 30° C., though such air can be heated subsequently to about 70° C. or higher. In some cases, for example, where continuous green fibers are made and gathered together in parallel alignment or juxtaposition in the form of a multi-fiber strand, the fibers or strand can be treated with a size to prevent the fibers from sticking together.

Further detail in fiberizing the viscous concentrate will be omitted here in the interest of brevity since such procedures are now known, e.g., see said U.S. Pat. No. 3,760,049.

The fibers in their green or unfired solid form generally comprise about 25 to 60 weight percent equivalent oxide solids (as determined by calcining a sample) and are dry in the sense that they do not adhere or stick to one another or other substrates and feel dry to the touch. But the "dry" fibers still contain substantial amounts of water and organic material, e.g., 40 to 75 weight percent, and it is necessary to calcine or fire the green fibers in order to remove further water and organic material and convert the fibers into refractory fibers. The term "dehydrative solidification", as used herein, therefore does not mean that all the water in the green fibers is removed. Thus, in a sense, this step can be called partial dehydrative solidification. It may be noted that at this point that the green fibers are transparent and clear under an optical microscope and, unless coloring additives are included in the viscous concentrate, they appear to look like colorless glass fiber. These green fibers are amorphous in that they do not contain any crystalline species discernible by x-ray powder diffraction analysis. The green fibers are strong enough for further processing and can be collected and fired without significant breakage.

In order to remove the balance of water and organic material from the green fibers and convert them to refractory fibers, they are calcined in a furnace or kiln (preferably an electric resistance furnace), this heating being carried out usually in air or other oxidizing atmosphere in a number of ways. For example, calcination can be accomplished by heating in a single step from a low temperature to a desired elevated temperature (e.g., from room temperature to 1200° C. in 45–90 minutes or more) or by heating in a series of steps at progressively higher temperatures, with or without cooling or storage between steps. In firing the green fibers, care should be exercised to avoid ignition of combustible material in or evolved from the fibers, for example by controlling the firing atmosphere, the movement of the firing atmosphere relative to the fibers, or the heating rate at low temperatures (200°–500° C.), since such ignition may cause the formation of opaque, fragile fibers.

The thermal evolution of these alumina based materials will vary slightly depending on the alumina precursors which are used and the identity and the amount of the inorganic materials which optionally can be added. For example, a ceramic material fashioned from a basic aluminum carboxylate solution containing 0.7 wt. percent equivalent iron in the form of the active nucleating agent of the present invention will convert from its initially amorphous form to a transition alumina phase (generally the eta or gamma alumina phase) between 800° and 900° C. This transition alumina phase will generally transform to the alpha phase between 900° and 1025° C. After heating above 1000° C., the sample is completely transformed to the alpha phase, and, if not strongly heated above 1100° C., will possess a novel, porous alpha alumina structure composed of spheroidal appearing alpha alumina crystallites with an average crystallite size of less than 100 nm (1000 Angstroms) in diameter. This structure can be made substantially dense by heating at greater than 1300° C. for short periods of time, e.g., 5–10 minutes at 1300° C. for the above example, or by heating for longer periods of time at lower temperatures. The addition of the optional inorganic additives will raise the alpha alumina transformation temperature in these alumina based materials. For example, the addition of 1 wt. % $ZrO_2$ in the form of zirconyl acetate to an aluminum carboxylate solution which has been treated with 0.7 wt. % equivalent iron in the form of the hydrous iron polymer, will raise the alpha alumina transformation temperature in the derived alumina about 90° C. (These transformation temperatures will also depend on the heating rate, so the values given here are approximate). The addition of 5 wt. % $ZrO_2$ in the form of zirconyl acetate as described above will raise the alpha alumina transformation temperature about 150° C. In these cases, however, a very fine microstructure (average grain size of the alpha alumina less than 0.5 micrometer) is still obtained.

With the addition of $SiO_2$, the alpha alumina transformation temperature will be raised as much as several hundred degrees centigrade depending on additive level and the nature of the $SiO_2$ precursor. The addition of 2 wt. % (of the aqueous precursor solution) of $SiO_2$ as Nalco 2326 will result in about a 75° C. increase in the transformation temperature.

While not wishing to be bound by theory, we believe that the incorporation of an effective amount of $SiO_2$ into the composition refractory body allows the preparation of alpha alumina bodies of reduced grain size and correspondingly higher strength and flexibility by enhancing the efficiency of the nucleating agent through a slowing of the rate of transformation to the alpha phase. This transformation is exothermic, that is, it liberates heat. Since the transformation is activated by an increase in temperature, the heat liberated by the conversation has an accelerating effect on the transformation rate. For the nucleated alumina of the present invention, differential thermal analysis indicates that, in the absence of silica, the exothermic peak caused by the transformation to alpha alumina is relatively sharp. Surprisingly, with the addition of about 0.5 to 3 wt. % (of the aqueous precursor solution) of silica, this exothermic peak is diminished in height and is broadened. Thus, the addition of the $SiO_2$ has the effect of slowing and moderating the alpha alumina transformation in addition to raising the conversion temperature. It is believed that this moderating effect on the transformation rate allows the conversion to occur more gradually and uniformly, allowing the final converted alpha alumina microstructure to become more homogeneous and fine grained. It is also possible that the increased transformation temperature could result in an increased number of active nucleation sites.

The inventive ceramic articles when completely transformed to the alpha phase by briefly firing or heat treating at temperatures below 1200° C. and not completely densified, can be made to possess a novel structure consisting of a microporous interior encased in a substantially dense alpha alumina sheath. Fibers with this structure are fairly strong and handleable, yet possess high surface area, for example, greater than 15 $m^2/g$ and a crystallite size less than 0.20 micrometer. For example, ceramic fibers derived from basic aluminum formoacetate containing 0.7 wt. % equivalent iron added in the form of the hydrous iron polymer nucleating agent when fired at 1000° C. for 30 minutes were found to be clear and shiny, and were 100% alpha alumina with a surface area of over 19 $m^2/g$ with a pore size of 24.5 nm (245 Angstroms). This corresponds to having approximately 32% open porosity. Examination by SEM revealed that the exterior of the fiber was very smooth (surface roughness height less than 100 nm). The microstructure of the interior of the fiber was different from the microstructure of the region of the fiber adjacent to the fiber surface. The microstructure of the interior of the fiber consisted of a porous, close packed network of very uniformly sized, [50 to 100 nm (500–1000 angstroms, average size roughly 80 nm)], spheroidal appearing (very weakly faceted) alpha alumina crystallites. The region extending 1–2 micrometers in from the surface of the fiber, which formed the outer sheath of the fiber, consisted of a substantially dense region of uniformly sized slightly larger crystallites (0.1 to 0.2 micrometer).

The green fibers can be calcined in a batch or continuous manner in an oriented form, such as strands or continuous yarn (a plurality of untwisted or slightly twisted parallel-aligned, virtually endless, continuous fibers) or hanks (continuous fibers or strands in coiled form), or tows (group of continuous fibers without definite twist and collected in loose form) or calcined in an irregular or random order, such as a mat of intermeshed, mechanically interlocked or tangled fibers, or calcined in the form or staple fiber. The continuous method of firing such fibers is described in U.S. Pat. No. 3,760,049.

This calcining step removes the balance of the water, decomposes and volatizes organic material, and burns off carbon, the resultant ceramic body being essentially carbon-free and of homogeneous chemical composition. The alumina based ceramics of the present invention also shrink somewhat during the calcining step. In the case of ceramic fibers, the linear shrinkage is generally 25% or more, and the volume shrinkage being generally about 50% or more. However, the shape of the articles during firing remains intact; for example, continuous green fibers when so fired are still of essentially continuous length, and green microspheres retain their spherical shape and smooth surface after this calcining step.

Because of the low alpha alumina conversion temperature and the ease of sintering of the fibers and other alumina articles such as flakes and microspheres prepared according to this inventive technology, high density microstructures composed of uniform very small crystallites can be obtained by firing at 1300°–1375° C. for a brief period of time (seconds to tens of minutes). Fine, dense microstructures can also be obtained by firing at lower temperatures, such as 1200° to 1250° C. for tens of minutes to several hours.

The alpha alumina based ceramics of the present invention can be made fully dense and can exhibit an elastic modulus greater than 345 GPa, even as high as 400 GPa. The term fully dense means essentially free of porosity and having no more than 4 percent by volume voids or porosity visible when a fracture section is viewed with scanning electron microscopy (SEM) at 25,000× magnification. In the case of powders and beads, standard analytical techniques to measure the density can be used to demonstrate that close to theoretical density is obtained when this criterion is met. Open porosity is detectable by standard analytical techniques such as the B.E.T. nitrogen technique (based on the adsorption of $N_2$ molecules from a gas with which a specimen is contacted). Such measurements yield data on the surface area per unit weight of a sample (e.g. $m^2/g$) which can be compared to the surface area per unit weight for a mass of perfect microspheres of the same size to detect open porosity. Higher specific surface area ($m^2/g$) indicates higher surface irregularities and/or porosity. Such measurements may be made on a Quantasorb ™ apparatus made by Quantachrom Corporation of Syossett, N.Y. Density measurements may be made by using pycnometric methods.

Unlike the prior art, the fibers of this invention are characterized by a microscopic average roughness height of less than 100 nm (1000 Angstroms) as determined by scanning electron microscopy (SEM). Instead of having crystallites forming surface protuberances having a height of roughly half the grain size, the surfaces of these fibers appear smooth, with a slight texture of the surface grains (representing the surface of a worn cobblestone road) being visible in SEM photographs. The smooth surface of these fibers makes them more handleable in a yarn or roving, and makes them suitable for weaving. In addition, the smooth surface of these fibers combined with their high modulus makes them highly desirable as a reinforcing and toughening phase in multi-phase systems such as in metal matrix composites. In such systems optimum toughening is obtained when the fiber can pull from the matrix without breaking; a smooth surface is conducive to this behavior.

The refractory fibers of this invention are transparent, smooth, glossy, round, stable, and colorless to light tan in color (unless additional color or turbidity is imparted by an optional inorganic additive, e.g., nickel salts will impart a green or blue color to the resulting ceramic article). These fibers have useful strength and flexibility, and can be handled with essentially no breakage.

The high modulus, refractory fibers of this invention are transparent to visible light. In describing a fiber of this invention as "transparent", this term means that the fiber when viewed under an optical microscope, e.g., with a stereoscopic microscope at 50× and oblique or transmitted light, has the property of transmitting rays of visible light. Thus, bodies beneath and contiguous with the transparent fiber, such as fibers of the same nature, can be clearly seen therethrough, the outline, periphery or edges of contiguous bodies beneath being sharply discernible. "Opaque" fibers, on the other hand, as referred to herein are those which are impervious to visible light, i.e., contiguous bodies beneath are obscured by opaque fibers and cannot be seen therethrough. "Translucent" fibers are those whose ability to transmit light falls between transparent and opaque, and though translucent fibers have the property of transmitting visible light to some degree, and therefore are somewhat or partially transparent, contiguous bodies beneath can be seen in a diffuse manner rather than in a clearly distinguishable or sharp manner. In fibers which are substantially all alpha alumina it has been found that transparency correlates well with good physical properties such as high tensile strength, flexibility and handleability.

Sometimes, because of vagaries in firing, a fiber product may be a mixture of these various types of fibers (viz., transparent, opaque, translucent) though generally one type will be present in a predominant amount, indicative of the true nature of the mixture, the other types of products present in minor amounts having their particular appearance due to incomplete firing at the desired temperature or due to overheating because of hot spots in the furnace.

The fibers of this invention can be employed alone or per se in various applications in the form in which they are obtained as calcined or fired, or their physical form can be modified, e.g., chopped into staple fibers, or in their form as prepared or as modified they can be mixed or coated with or bonded to other materials. The high modulus, smooth surface, and refractory nature of these fibers makes them very desirable for applications such as the reinforcing and toughening of metals and ceramics, although the high modulus of these fibers also enables them to be useful in the reinforcing and toughening of plastics and other materials.

Mats, batting, fabrics and other structures fabricated from the fibers of this invention will be useful as lightweight thermal insulation for high temperature equipment and for the purpose of heat or flame shielding or reflecting. They will also be useful in filtering particulate matter from hot gases, such as produced by incinerators, discharge stacks from industrial or utility plants, coal gasification operations, and other operations where high temperature, particulate laden gases are discharged, for example, to the atmosphere.

The inventive alumina based ceramic materials of this invention can also be fashioned in the form of microspheres, microcapsules, flakes, fine powders and coatings. The same chemical precursors used to generate the inventive fibers can be used to produce ceramic articles in these other forms. For example, spherical particles or microspheres of the inventive alumina based ceramic materials can be prepared by using the shaping and dehydrative solidification techniques and equipment of the prior art (e.g., U.S. Pat. Nos. 3,709,706 to Sowman, 3,329,745 to La Grange, 3,331,783 to Braun et al., 3,331,785 to Fitch et al., 3,340,567 and 3,380,894 to Flack et al.). In these preparations, the liquid precursor can have a variable equivalent solids content, for example, of 15 to 40 weight percent, and a viscosity, for example, of 20 to 40 cP. The liquid precursor can be dispersed in the form of small droplets in an organic dehydrating liquid having low water solubility (e.g., 1 to 30 volume percent), such as $C_4$ to $C_{10}$ alkanols, e.g., butanol, hexanol, ethylbutanol, and ethylhexanol. Some of these alcohols can be nearly saturated with water, such as butanol, or partly mixed with water, e.g., hexanol mixed with 3 to 6 weight percent water, or used in anhydrous form, e.g., 2-ethyl-1-hexanol. These partly water-immiscible alcohols have sufficiently small solubility for water that water is extracted from the dispersed droplets at a rate low enough to allow the droplets to dehydratively solidify into microspheres of uniform surface and internal structure. The amount of dehydrating liquid used should be sufficient to prevent the droplets or spherical particles formed therein from sticking together. In the case of 2-ethyl-hexanol, the amount of water in the dehydrating liquid is maintained at less than 2 volume percent.

In the case of the preparation of very small microspheres of fine powders, the dehydration of a dispersion of the alumina based ceramic precursor in an organic liquid can be carried out simply by heating the dispersion above the boiling point of the aqueous phase while maintaining the fine state of subdivision in the dispersion such as is described in British Pat. No. 1,032,105.

Gelation of the basic aluminum salt derived microspheres or fine powders while dispersed in an organic phase can also be accomplished by thermally or chemically driving the hydrolysis of the aluminum complexes which are present. In the case of the thermally driven gelation, the precursor is generally concentrated to greater than 15% solids, and the dispersion is heated to greater than 80° C. for extended periods of time (greater than 30 minutes, usually greater than one hour), so as to allow the relatively sluggish crosslinking of the aluminum complexes to occur.

In the case of the chemically driven hydrolysis, an additional agent is added to the precursor mixture or to the forming medium so as to controllably raise the pH of the precursor solution or to act to crosslink the aluminum complexes in the precursor solution after the precursor solution is dispersed in the forming medium, and, in this fashion, promotes gelation of the microspheres. Representative examples of this can be found in the use of hexamethylenetetramine as taught in U.S. Pat. Nos. 2,698,226, 2,620,314, 2,774,743, 3,714,071, in the use of urea as taught in U.S. Pat. No. 4,542,113, and in the use of ammonium acetate - ammonium hydroxide mixtures or ammonia as taught in U.S. Pat. Nos. 2,666,749 and 4,392,987. Many other variants of these techniques are known to those skilled in the art.

In preparing microspheres, the precursor fluid may be fed into the forming medium in the form of droplets and gelled as such or added as a stream of liquid either above or below the surface of the forming medium and sheared by agitation to produce droplets prior to gelation. The droplets can be further comminuted by sonification or by other methods which subject the dispersion to high shear conditions. After the gelation of the dispersed precursor droplets, the resulting spherical particles can be separated from the forming medium, for example, by filtering or by centrifugation. The particles can at this point be allowed to dry in air at ambient temperatures or higher, for example 60° to 85° C., to a solids content of 35 to 80 weight percent, and then calcined, or they can be calcined directly after gelation and separation according to a controlled firing schedule to obtain a desired densification and microstructure as described for the inventive alpha alumina based ceramic fiber. The particles in their unfired form will generally be clear, transparent, slightly amber in color, and spherical in shape when examined under an optical microscope. If a colored inorganic additive has been used in the precursor mixture, the particles in their unfired form will take on the color characteristics of the inorganic additive, for example, if a small amount of a water soluble nickel salt were present in the precursor liquid, the unfired particles would appear green in color; if a small amount of turbid zirconia colloid were present in the precursor liquid, the particles would be slightly turbid. After firing to convert the particles to alpha alumina, the particles which have been prepared from precursors which contained none of the previously mentioned additional inorganic additives appear colorless to a light tan and clear to opalescent depending on the thermal history and the content of iron in the sample. Microspheres can be prepared which are up to 500 micrometers in size, depending on the precursor materials and the method of preparation.

Another technique for making spherical particles is to spray-dry the precursor liquid in a dilute or concentrated, non-viscous form. Atomizing of the precursor liquid can be carried out, for example, with pressure nozzles at 15 to 20 atmospheres, the droplets or spheres as made descending in a countercurrent of dry air at ambient room temperature or in a flowing stream of warm air.

After calcining, the smaller particles such as those less than 10 micrometers in diameter, particularly those less than 3 micrometers in diameter, are useful as precursor powders for the production of other ceramic articles via the application of various ceramic preparative techniques which are known to those skilled in the art including compacting such as slip casting, cold pressing, hot pressing and injection molding. These powders can be used in the preparation of ceramics after partial calcining to an amorphous or transition alumina state or after calcining either partially or fully to alpha alumina. Because of the very low alpha alumina transformation temperature, the inventive powders can be completely converted to alpha alumina by calcining at temperatures below 1000° C. resulting in little agglomeration or sintering during this heat treatment. This advance removes the need for lengthy milling of the powders after the alpha alumina transformation. The smaller ceramic microspheres are also useful as microfinishing abrasives and as fillers and reinforcing agents in such materials as glass, refractory materials, ceramics, metal matrix materials and polymers.

As noted above, transparent ceramic spheroids (microspheres) comprising alpha alumina can be prepared utilizing the inventive processes described herein. Because of the high hardness, these materials are useful as durable, retroreflective lens elements in pavement markings. High clarity can also be obtained by calcining so as to obtain full conversion to alpha alumina but only partial densification. In this case a microstructure similar to the novel high surface area structure is obtained. Although not possessing a high density, hardness values in excess of 1000 Knoop can be obtained (as measured by diamond indentation in specimens which have been mounted in epoxy resin and polished to obtain a planar surface) in microspheres which also possess high clarity.

The larger inventive alpha alumina based ceramic particles can also be used as catalyst supports (when prepared in the porous form), media for attrition mills such as sand mills, peening materials, high temperature ball bearings, abrasives, and as fillers and reinforcing agents in such materials as glass, refractory materials, ceramics, metal matrix materials, and polymers.

Refractory products in the form of flakes or films can also be prepared from the precursor liquid, with or without the aforementioned optional inorganic additives. Here again, it is not necessary to concentrate the precursor liquid. Rather, the precursor liquid can be poured, knife-coated, spread, or the like in the form of a sheet or film on a suitable non-adhering, smooth inert substrate, such as a film of polyester, polytetrafluoroethylene (Teflon TM, Dupont), glass, etc. If desired, a suitable wetting agent can be added to the precursor liquid to increase the wetting of the substrate by the applied precursor liquid, such increased wetting enhances the formation or uniformity of film or flakes. The applied film, e.g., 25 to 1270 micrometers (1 to 50 mils), normally 25 to 76 micrometers (1 to 3 mils), thick is then dried in air at ambient room temperature or higher, like that described above for the green fibers, microspheres and particles. In the course of this drying, the film, depending upon its thickness and the degree to which it wets the substrate, may tend to crack and form flakes. After the film has sufficiently dried in air, it can be removed from the substrate, for example by lifting or scratching it off. The removed film can be comminuted to form irregularly shaped particles, flakes, or aggregates, e.g., 1.6 to 25.4 mm (1/16" to 1") in length, 0.5 to 25 micrometers thick, or ground to form powders of small size. In any event, the dried film, flake, or powder is then heated to convert it into refractory material, using firing temperatures like those described above in the firing of fibers. In systems containing no additional inorganic additives, the fired refractory generally will be transparent to opalescent under an optical microscope. As previously described for particles and fibers, the transparency and color of the materials which contain the optional inorganic additives will be effected by the identity and the content of the inorganic additive.

On substrates such as ceramics and metals which can endure the thermal processing of the inventive coating, adherent coatings can be applied which can be fired to yield a continuous, hard and chemically resistant surface. The substate surface must be sufficiently hydroxyfunctional to allow bonding with the basic aluminum salt during the calcining of the coated article. Multiple coatings can be applied to render the coating more continuous and impenetrable.

The alpha alumina based materials of this invention are refractory and can be used at elevated temperatures. For example, the alpha alumina fibers, without other inorganic additives in addition to the nucleating agents, can be used up to about 1000° to 1400° C. depending upon the length of service at such high temperatures. However, exposure to temperatures above 1400° C. generally will cause continued grain growth and this will result in a progressive loss of strength and flexibility.

This invention is illustrated in the following examples. Tensile strength data were obtained by the application of load on a single filament (gauge length 6.4 mm) with a uniform loading rate of 120 g per minute. Modulus of elasticity data were obtained on single fibers using a vibrational resonance technique. A short (1 to 2 cm) length of fiber is glued onto a metal substrate attached to an acoustical driver so that it is cantilevered out from the substrate perpendicular to the direction of vibration. When the acoustical driver is oscillated, the fiber will have several distinct and unique frequencies of resonance which can be observed with a binocular microscope. The dynamic elastic modulus of the fiber can be calculated according to the following equation:

$$E = 64\pi^2 p (lf/dk)^2$$

where E=elastic modulus, l=fiber length, d=fiber diameter, F=resonant frequency, K=mode coefficient, and p=fiber density.

Objects and advantages of this invention are further illustrated by the following examples, but the particular materials and amounts thereof recited in these examples, as well as other conditions and details, should not be construed to unduly limit this invention.

EXAMPLE 1

Fibers of hydrous iron polymer nucleated alpha alumina were generated in the following manner. First, an iron nitrate solution was prepared by dissolving 101.86 g of Fe(NO$_3$)$_3$.9H$_2$O in enough water to yield a total volume of 2500 ml. Then 48.56 g of NH$_4$HCO$_3$ was dissolved in a minimum of water and was slowly added to the rapidly stirred iron nitrate solution over a period of 5 minutes. The solution darkened markedly during the course of the addition. The solution was then stirred and heated (maximum temperature 80° C.) and dialyzed by passing deionized water through a dialysis tube which was immersed in the hydrolyzed iron solution. The heating was discontinued after one hour but the dialysis was carried out until the final dispersion was 0.30% by weight equivalent iron. The dialysis increases the shelf life of this hydrous iron polymer dispersion but is not necessary for effective nucleation. The solution was clear and dark red-brown at this point.

Next an alumina precursor, basic aluminum nitroformoacetate (ANFA), was prepared. A solution was prepared by dissolving aluminum formoacetate (for preparation see Kirk-Othmer, *Encyclopedia of Chemical Technology*, 3d edition, Vol. 2, 202–204 (1978); Al:carboxylate=1:2; formate:acetate=1:1) in water with heating to yield a 6.4 wt.% fired solids content solution. A basic aluminum nitrate solution was prepared by charging a thick walled flask with 300 g of deionized water and 62.9 ml of concentrated HNO$_3$, stirring and heating to a boil and adding 26.98 g of aluminum powder to the boiling mixture over a period of 2 hours in 5 lots of roughly 5 g each. Deionized water was added occasionally to keep the solution volume above 300 ml. After 4 hours when the dissolution of the aluminum was essentially complete, the solution was filtered through a Whatman #5 filter and found to be 18.5 wt. % alumina. A mixture of 200 g of the basic aluminum nitrate solution and 576.1 g of the aluminum formoacetate solution was boiled for 1 hour and filtered through a Whatman #5 filter. This resulting basic aluminum nitroformoacetate solution was found to contain 13.6 wt. % alumina.

Finally, 15.9 g of the 0.30% hydrous iron polymer colloid was added with rapid stirring to 100.0 g of the 13.6 wt. % basic aluminum nitroformoacetate solution. To this mixture was added 2.5 ml of 85 wt. % lactic acid and then concentrated by evaporation in a rotating flask to 26 wt. % fired solids. Fibers were formed by extruding this concentrate through a spinnerette with 76 micrometer (3 mil) holes and drawing down and collecting the fibers as they were formed onto a rotating wheel. The continuous fibers were fired in a tube furnace under a slight flow of air according to the following schedule: room temp. to 500° C., 4 hours; 500° C. to 950° C., 1 hour; hold at 950° C., 1 hour, cool with the furnace. The fibers at this point were clear and strong. Samples of the fibers fired to 1350° C. were found to be composed of 0.2–0.5 micrometer alpha alumina grains with an average grain size of about 0.25 micrometer.

EXAMPLE 2

An aluminum nitroformoacetate solution was prepared and treated with the hydrous iron polymer solution in an identical fashion as that described in example 1. This solution was evaporated in a rotating flask to about 20 wt. % fired solids and was added dropwise to rapidly stirred, hot (95° C.) peanut oil. The stirring of the oil was vigorous so as to break up by shear the drops of precursor concentrate into smaller, spherical droplets. After stirring in the heated oil for 1 hour, the smaller, fully gelled microspheres were separated from the larger beads by sedimentation (the larger beads were not fully gelled), and these smaller beads were separated by filtration. These were fired according to the schedule described in example 1, and were then high fired to 1200° C. for 10 hours. Examination with a binocular optical microscope revealed that the particles consisted of beads, bubbles, and broken fragments of beads and bubbles. Intact, clear specimens of beads could be found which were about 150 micrometers in diameter. The intact, clear beads were retroreflective and could be used as reflective lens elements, for example, in pavement marking strips. The specimen were crushed and examined by scanning electron microscopy (SEM). The surface of the beads were smooth and the fracture surfaces showed a uniform, substantially dense structure consisting of 0.1–0.4 micrometer crystallites with an average grain size of about 0.3 micrometer. The surface area of the small particles was found to be 0.13 $m^2/g$.

EXAMPLE 3

An aluminum formoacetate solution of composition $Al(OH)_{1.8}(O_2CCH_3)_{0.6}(O_2CH)_{0.6}$ was prepared by digesting aluminum powder in an acetic acid - formic acid solution under reflux condition. A 1000 ml round bottom flask was charged with 400 g of deionized water, 34.5 ml of glacial acetic acid and 25.6 ml of concentrated formic acid. The solution was brought to a rolling boil and 26.98 g of aluminum metal powder was added to the boiling carboxylic acid mixture in 3 portions of roughly 9 g each over a 2 hour period. An exothermic reaction ensued after the initial addition, and the rate of the reaction was moderated by the occasional addition of room temperature deionized water. The digestion was continued for 10 hours, and the slightly hazy solution was cooled, filtered through a Whatman #54 and a Whatman #5 filter paper. The percent solids was determined by gravimetric analysis to be 7.16%. Solutions of this sort were used as alumina sources in the remaining examples.

A solution of the hydrous iron polymer was prepared by mixing a solution of 8.37 g of hydrous iron polymer solution which was 0.60% by weight equivalent iron (prepared as described in example 1 with the exception that the hydrolyzed iron nitrate solution was boiled briefly after dialysis) and 9 g of deionized water. This solution was added to 200 g of rapidly stirred aluminum formoacetate solution (7.16 wt. % $Al_2O_3$). This solution yielded alumina which contains 0.35 wt. % equivalent iron. To this solution was added with stirring 4.5 ml of lactic acid (85 wt. %). This solution was concentrated by evaporation in a rotating flask to about 25 wt. % fired solids and was formed into fibers according to the process outlined in example 1. The continuous fibers were fired in tube furnace according to the following schedule: room temperature to 330° C., 1 hour; 330° to 400° C., 4 hours; 400° to 700° C. 1 hour; hold at 700° C., 1 hour; then cool with the furnace. A sample of these fibers were fired to 1200° C. for 10 minutes. These fibers were clear, shiny and strong and were fully converted to alpha alumina.

Microscopic examination of these fibers by SEM revealed that these fibers possess a very smooth surface (microscopic roughness height less than 100 nm) with an average grain size of 0.2–0.3 micrometer. The largest grains observed were less than 0.5 micrometer. The fibers appeared substantially dense. The average tensile strength of these fibers was greater than 1.66 GPa.

EXAMPLE 4

Example 3 was repeated with the exception that 16.82 g of hydrous iron polymer solution (solution was 0.60 wt. % equivalent iron) diluted with about 15 ml deionized water in place of the 8.37 g of hydrous iron polymer solution diluted with 8 ml of deionized water. This yields an alumina precursor which contains 0.7 wt. % equivalent iron. Fiber properties and microstructures were essentially indistinguishable from those of Example 3. The fibers appeared fully dense after firing to 1300° C. for 3 minutes and have an average grain size of 0.3–0.4 micrometer. No grains larger than 0.5 micrometer were observed. The average surface roughness height was less than 100 nm.

EXAMPLE 5

A solution of hydrous iron polymer was prepared by diluting 16.3 g of stock solution of hydrous iron polymer (0.60% weight percent equivalent iron, prepared as described in example 1 with the exception that the hydrolyzed iron nitrate solution was boiled briefly after dialysis rather than heated at 80° C. for a long period of time) with 15 ml of deionized water. This solution was added to 150 g of a rapidly stirred solution of aluminum formoacetate (9.25 wt % $Al_2O_3$). This mixture was stirred rapidly while 4.63 g of zirconia sol [Zr150/20 TM, Nyacol Products, Inc., Ashland, Mass., 20% $ZrO_2$, particle size about 1500 angstroms, nitrate counterion, 0.3 moles $NO_3$/mole $ZrO_2$] was added. The turbid solution was concentrated by evaporation in a rotating flask until the solution had the viscosity of honey. The solution was poured into an aluminum tray and dried in an oven at 85° C. overnight. The resulting irregularly shaped pieces were fired up to 700° C. over a 4 hour period. After cooling, the prefired pieces were fired at 1375° C. for 5 minutes. The pieces at this point were shiny, white, and hard. Microscopic examination by SEM of crushed pieces revealed that the material was relatively dense and possessed a very fine and uniform microstructure. Average grain size was about 0.2 micrometer, and no grains above 0.4 micrometer were observed. The crystallites were found to not be uniformly oriented according to the optical criterion described in U.S. Pat. No. 3,808,015. Tetragonal zirconia and alpha alumina along with a small amount of monoclinic zirconia were found to be the only crystalline phases present as determined by X-ray diffraction analysis. The largest intact pieces with no cracks were about 600 micrometers in size.

Microfibers prepared from the precursor solution used in this example can be formed into a batting to be used as high temperature insulation.

EXAMPLE 6

A solution was prepared identical to that of Example 5. Before concentrating, 4.5 ml of lactic acid (85 wt. %) was added and the solution was mixed by stirring. The solution was concentrated by evaporation in a rotating flask to about 24 wt. % fired solids, and was formed into fibers by extrusion through a spinnerette as described in example 1. The fibers were prefired to 700° C. over a 4 hour period and fired at 1450° C. for 15 minutes. After cooling the fibers were examined and found to be shiny white and very strong. Microscopic examination by SEM revealed that the fibers possessed a very fine and uniform microstructure. Average grain size was 0.3–0.4 micrometer and no grains were observed above 0.5 micrometer in size. The surface of the fibers had a very fine "flattened cobblestone" structure with the average roughness height being less than 100 nm. The crystallites in these refractory fibers were found to be uniformly oriented according to the optical criterion described in U.S. Pat. No. 3,808,015.

EXAMPLE 7

A solution of hydrous iron polymer was prepared by diluting 16.85 g of stock solution of hydrous iron polymer (0.60 wt. % equivalent iron, prepared as described in example 1 with the exception that the hydrolyzed iron nitrate solution was boiled briefly after dialysis rather than heated at 80° C. for one hour) with about 15 ml deionized water. This solution was added to 200 g of rapidly stirred aluminum formoacetate (7.16 wt. % $Al_2O_3$). A magnesium acetate solution was prepared by dissolving 0.154 g $Mg(O_2CCH_3)_2.4H_2O$ in 10 ml of deionized water. The magnesium acetate solution along with 4.5 ml of lactic acid (85 wt. % solution) were added with stirring to the basic aluminum salt solution. The solution was filtered through a Whatman #5 filter paper and then concentrated and formed into fibers as described in example 1 and was fired according to the schedule described in example 3. The prefired sample was high fired to 1325° C. for 10 minutes. The resulting fibers were clear and shiny. The average tensile strength was found to be greater than 966 MPa, and the average specific modulus was 98.7 GPa. Examination of the fibers by SEM (scanning electrom microscopy) revealed that the surface of the fibers had a very fine texture with a microscopic surface roughness height of less that 1000 angstroms and a microscopic roughness period (defined as the width of the individual elements of surface texture) of about 80 to 200 nm. The crystallites were 0.2–0.5 micrometer in diameter with an average crystallite size of about 0.3–0.4 micrometer (the average crystallite size varied slightly from fiber to fiber). The crystallites were found to be uniformly oriented according to the optical criterion described in U.S. Pat. No. 3,808,015.

EXAMPLE 8

A yellowish-orange solution of 7.3 g $Fe(NO_3)_3.9H_2O$ in 20 g deionized water was rapidly added to 250 g vigorously stirred boiling water. A clear, deep red sol (0.33 wt. % equivalent iron) was immediately formed. 2.13 g of this sol was added to a rapidly stirred mixture of 10.8 g aluminum formoacetate and 1.5 g lactic acid to give a composition of $Al_2O_3+0.7$ wt. % equivalent iron. This was dried at 60° C. and fired slowly to 700° C., followed by a rapid heating to 1400° C. for 1 minute. The fired pieces were clear to slightly hazy with a grain size of 0.2 micrometer as determined by optical microscopy.

EXAMPLE 9

A spinning sol was prepared by the method of Example 3 with 13.3 g hydrous iron polymer (0.39 wt. % equivalent iron) being added to 162 grams of rapidly stirred aluminum formoacetate solution (9.25 wt. %). To this, 2.5 g of an 85% lactic acid solution was added. While maintaining rapid stirring, 0.52 g of Nalco 2326 colloidal silica (50 angstrom particle size, ammonium ion stabilized, 14.5% $SiO_2$) was added. A final addition of 0.096g $Mg(NO_3)_2.6H_2O$ dissolved in 20 g $H_2O$ was added dropwise to give a nominal oxide composition $Al_2O_3+0.35\%$ equivalent iron$+0.5\%$ $SiO_2+0.1\%$ MgO. Fibers were spun, collected and heated to 650° C. in air at a heating rate of 150° C. per hour. The prefired fibers were then rapidly heated to 1400° C. in air in a CM Rapid Temp Furnace (CM, Inc., Bloomfield, N.J.) and held at this temperature for 10 minutes to convert them to alpha alumina. These fibers were flexible, non-friable and transparent under transmitted light. A slight haziness or barely discernable mottling could be discerned at 500× magnification. Scanning electron microscopy (SEM) revealed a uniform, non-oriented microstructure with a grain size of 0.1–0.2 micrometer with very little, if any evident porosity. These fibers were determined to have a tensile strength of 1.14 GPa (165,000 psi) and an elastic modulus of 373 GPa (54 Mpsi). The fibers remained flexible, transparent and handleable after a 5 hour soak at 1400° C.

EXAMPLE 10

A transparent red-orange spinning sol was prepared by the method of Example 3 having the following components to give an oxide composition $Al_2O_3+0.53\%$ weight percent equivalent iron$+0.5\%$ $SiO_2$:
  11248 g aluminum formoacetate (8.89% $Al_2O_3$)
  1000 g HIP (0.53 weight percent equivalent iron)
  34.1 g Nalco 2326 silica sol (14.5% $SiO_2$)
  245 g lactic acid (88%)
  300 g polyvinylpyrrolidone (PVP K-30 TM (50% aqueous solution), GAF, NYC, NY)

100 g Karo ™ dark corn syrup

The HIP had been boiled 40 minutes and then dialyzed overnight. Fibers were spun as in Example 1 and fired according to the following schedule: room temperature to 700° C., 4 hours; 700° to 1300° C., 10 minutes; hold 5 minutes and then cool. SEM revealed microcrystalline grains 80–200 nm in size with an average grain size of approximately 100–130 nm. The average tensile strength was measured to be 1.5 GPa (218 Kpsi). The fibers were flexible and handleable.

EXAMPLE 11

Fibers were prepared as in Example 9 but with 26.6 g HIP (0.39 wt. % equivalent iron) and 2.07 g Nalco 2326 being added to give a composition $Al_2O_3$+0.7 weight % equivalent iron+2% $SiO_2$. When rapidly heated to 1300° C. followed by immediate cooling, these fibers appeared virtually transparent and glassy. X-ray diffraction indicated the complete conversion to alpha alumina. No alumino-silicate phase was detected. SEM revealed an ultrafine and uniform grain structure with substantially all the grains being less than 100 nm and most being in the range 40–80 nm. When the fibers were fired to 1400° C. for 10 minutes, they appeared slightly more hazy then previously but were still transparent and flexible. These fibers did not absorb a penetrant dye, indicating the absence of open porosity. These fibers were quite flexible and handleable and possessed an average tensile of 1.12 GPa (163 Kpsi). SEM indicated that the fibers have an equiaxed grain structure with a grain size of 100–200 nm. X-ray diffraction indicated the presence of a small amount of mullite. When fired for 1 hour at 1400° C., the fibers remained strong and the grain size appeared unchanged and the elastic modulus was measured to be 331 GPa (48 Mpsi).

EXAMPLE 12

Fibers were prepared as in Example 9 except that 5.17 g Nalco 2326 were added to give 5.0% $SiO_2$ by weight $Al_2O_3$. When fired to 1300° C. for 10 minutes they appeared to be converted to alpha alumina and were virtually transparent with a grain size less than 0.2 micrometer. The fibers were strong and flexible. When fired to 1400° C. for 5 minutes, the fibers were considerably weaker and more friable. They appeared to be more strongly mottled under transmitted light (500×), presumably due to grain coarsening during firing.

EXAMPLE 13

4.5 g of 85% lactic acid solution was added to 378 g of ANFA solution (5.27 wt. % $Al_2O_3$). 37.5 g HIP (0.28 wt. % equivalent iron) was added slowly to the rapidly stirred ANFA solution. While maintaining rapid stirring, 0.69 g Nalco 2326 was added, giving a sol composition of $Al_2O_3$+0.53 wt. % equivalent iron+1.0% $SiO_2$. 10 g of this sol was poured into a gently swirling mixture of 50 g 2-ethyl-1-hexanol and 20 g n-butanol in a 500 ml flask to form gelled microparticles. Swirling was continued for 5 minutes and the dispersion was filtered with No. 54 Whatman filter paper. The removed microparticles were dried slowly at room temperature and slowly heated to 800° C. to give clear, transparent and shiny, amber-colored microspheres with diameter in the size range of 2–40 micrometer. These microspheres were then rapidly heated to 1300° C. for 5 minutes. The microspheres lost most of their amber coloration but remained transparent and shiny although possessing a slight haze.

EXAMPLE 14

Fibers were prepared as in Example 9 except with the exception that only 13.3 g of HIP solution and 0.52 g Nalco 2326 were added to give a composition $Al_2O_3$+0.35 wt. % equivalent iron+0.5 wt. % $SiO_2$. When fired to 1400° C. for 5 minutes to convert them to alpha alumina, they appeared transparent to slightly hazy. The fibers were quite strong.

To determine if crystal orientation was present in the fibers, three different sample mountings were prepared for X-ray diffraction analysis according to U.S. Pat. No. 3,808,015, col. 10, lines 35 to 67.

Flat Mounting: Fibers are placed in a holder so that the fiber axes are parallel to the X-ray beam when the diffractometer is at 0° 2Θ with their ends pointing toward the tube and detector.

End Mounting: A thick parallel bundle of fibers was cemented together and placed in a holder such that the fiber axes are perpendicular to the X-ray beam when the diffractometer is at 0° 2Θ. In addition, a sample of fibers was ground to less than 325 mesh and affixed to the diffractometer mount to give a randomly oriented sample.

Diffractometer scans were made for each sample from 2Θ=60° to 2Θ=80° such that both the (030) and (1.0.10) peaks were on scale. The intensity of the diffracted peaks were measured for each sample. Crystal orientation is present in the fiber if the intensity ratio (030)/(1.0.10) of the flat mounting differs from the intensity ratio of the end mounting by at least 1.0 unit. The results are given below:

| Sample | (030)/(1.0.10) |
| --- | --- |
| powder | 2.43 |
| flat mounting | 1.42 |
| end mounting | 5.50 | indicating significant orientation. This result, wherein the flat mounting value is less than the end mounting value, indicates that the c-axes of the alpha alumina crystallites tend to be aligned perpendicular to the fiber axis.

EXAMPLE 15

4.5 g of lactic acid (88%) was added to 225 g of aluminum formoacetate (AFA) solution (9.0 wt. % alumina). 37.5 g of HIP (0.28 wt. % equivalent iron) was added slowly to the rapidly stirred AFA solution. A hydrolyzed ethyl silicate solution was prepared as follows. One drop (0.04 g) concentrated HCl was added to a solution of 7.2 g $H_2O$ and 14 g ethanol. This was added to 20.8 grams rapidly stirred, hot (50° C.) tetraethylorthosilicate to give a water-clear silica sol. 1.05 g of this sol was added to the AFA-HIP solution with rapid stirring to give a composition $Al_2O_3$+0.53 wt. % equivalent iron+1.0 wt. % $SiO_2$. Further additions of 4 g dimethylformamide and 8 g of a 50% aqueous solution of polyvinylpyrrolidone K-30 grade were made to aid fiberizability. Fibers were prepared as in example 1 and the fibers were heated to 650° C. in air at a heating rate of 150° C. per hour and then at 100° C. per minute from 650° C. to 1400° C. for 5 minutes. The fibers were very strong and nonfriable. SEM indicated a grain size of 100–200 nm with no porosity being evident.

EXAMPLE 16

A transparent iron oxide sol was prepared by the thermal hydrolysis of Fe (III) chloride as follows. Three drops (0.1 g) of 37% HCl were added to 1000 ml deionized water to give a $10^{-3}$M solution. 0.0406 g $FeCl_3.6H_2O$ was dissolved in 250 g of this solution to give a water-clear 0.0006M iron (III) chloride solution. This solution was placed in a covered jar and put in a 95° C. oven for four hours. When removed, the sol temperature was measured to be 89° C. This resulting orange-yellow sol was gradually added to 21.6 g of a rapidly stirred AFA solution (9.0% $Al_2O_3$) to give the composition $Al_2O_3$+0.4 wt. % equivalent iron. This was dried in a tray at 90° C., slowly fired to 650° C. and rapidly heated to 1400° C. for 5 minutes. The fired pieces were transparent with virtually no haze and were estimated by optical microscopy to have a grain size of approximately 100 nm.

Various modifications and alterations to this invention will become apparent to those skilled in the art without departing from the scope and spirit of this invention, and it should be understood that this invention is not to be unduly limited to the illustrative embodiments set forth herein.

We claim:

1. A solid, fired refractory article comprising in the range of 0.1 to 7.0 percent by weight iron equivalence and at least 60% alumina by weight in which at least 99 percent of the alumina is in the alpha phase having a uniform grain structure comprising alpha alumina crystallites wherein the average crystallite diameter is less than 0.5 micrometer and no grains are larger than 0.5 micrometer in diameter, the density of the article is greater than 90% of theoretical density, and the surface roughness height of said article is less than 100 nm.

2. The article according to claim 1 wherein the average alpha alumina crystallite diameter is less than 0.3 micrometer.

3. The article according to claim 1 further comprising an effective amount of at least one modifying additive to provide at least one of reduced grain size, improved elastic modulus, and color.

4. The article according to claim 3 wherein said modifying additive is silica or a precursor thereof.

5. The article according to claim 1 comprising at least 90 percent alumina by weight.

6. The article according to claim 1 which is a fiber, bead, flake, bubble, irregularly shaped particle, or coating.

7. The article according to claim 1 which is transparent.

8. The article according to claim 3 wherein said modifying additive is selected from the group consisting of a colloidal or particulate metal oxide, or a colloidal or particulate precursor to a metal oxide.

9. The article according to claim 1 which is selected from the class consisting of beads, flakes, bubbles, and randomly shaped particles, wherein the alpha alumina crystallites are substantially randomly oriented.

10. The article according to claim 3 wherein said additive is selected from the group consisting of zirconia, silica, magnesia, and precursors thereof.

11. The article according to claim 6 which is a fiber.

12. A fiber according to claim 11 wherein at least 95 percent of the alpha alumina crystallites are less than 0.25 micrometers in diameter.

13. The fiber according to claim 11 wherein at least 95 percent of the alpha alumina crystallites are uniformly oriented as determined by optical and X-ray analysis.

14. The fiber according to claim 11 wherein said fiber is a flexible, high modulus ceramic fiber.

15. The article of claim 6 wherein said article is a ceramic bead.

16. A solid, shaped and fired refractory article comprising in the range of 0.1 to 7.0 percent by weight iron equivalence and at least 60 percent alumina by weight in which at least 99 percent of the alumina is in the alpha phase comprising alpha alumina crystallites wherein at least 99 percent of the alpha alumina crystallites are less than 0.2 micrometer in diameter and all are less than 0.7 micrometer in diameter, and the specific surface area of the article is greater than 15 $m^2/g$.

17. The article according to claim 16 having a microporous interior and having an alpha alumina sheath, said sheath having greater than 90 percent of theoretical density.

18. A ceramic fiber comprising in the range of 0.1 to 7.0 percent iron equivalence and at least 60% alumina by weight in which at least 99 percent of the alumina is in the alpha phase having a uniform grain structure comprising alpha alumina crystallites wherein the average crystallite diameter is less than 0.5 micrometer and at least 99 percent are less than 0.7 micrometer in diameter, said fiber having a density of at least 90% of theoretical density, and the surface roughness height of said fiber is less than 100.0 nm.

19. A solid, fired refractory article comprising in the range of 0.1 to 7.0 percent by weight iron equivalence and at least 60% alumina by weight in which at least 99 percent of the alumina is in the alpha phase having a uniform grain structure comprising alpha alumina crystallites wherein the average crystallite diameter is in the range of 0.3-0.4 micrometer, and no grains are larger than 0.4 micrometer, the density of the article is greater than 90% of theoretical density.

20. The article according to claim 4 which is a fiber.

* * * * *

UNITED STATES PATENT AND TRADEMARK OFFICE
CERTIFICATE OF CORRECTION

PATENT NO. : 5,185,299
DATED : February 9, 1993
INVENTOR(S) : Thomas E. Wood et al.

It is certified that error appears in the above-indentified patent and that said Letters Patent is hereby corrected as shown below:

Col. 3, lines 67-68, "100.0 nm, 101.0 nm, 102.0 nm, 103.0 nm" should be -- 100. nm, 101. nm, 102. nm, 103. nm --

Col. 16, line 28, "$E=64\pi^2 p(1f/dk)^2$" should read -- $E=64\pi^2 p(1f/dK)^2$ --.

Col. 23, line 36, "100 nm" should read -- 100. nm --.

Col. 24, line 44, "100.0 nm" should read -- 100. nm --

Signed and Sealed this

Thirty-first Day of May, 1994

Attest:

BRUCE LEHMAN

*Attesting Officer*          *Commissioner of Patents and Trademarks*